US008324502B2

(12) United States Patent
Kameda et al.

(10) Patent No.: US 8,324,502 B2
(45) Date of Patent: Dec. 4, 2012

(54) COVERED CABLE ASSEMBLIES AND METHODS AND SYSTEMS FOR FORMING THE SAME

(75) Inventors: Floyd Kameda, Mountain View, CA (US); Kathryn Marie Maher, Cary, NC (US); David Francis Pearce, Swindon (GB)

(73) Assignee: Tyco Electronics Corporation, Middletown, PA (US)

(*) Notice: Subject to any disclaimer, the term of this patent is extended or adjusted under 35 U.S.C. 154(b) by 585 days.

(21) Appl. No.: 12/356,005

(22) Filed: Jan. 19, 2009

(65) Prior Publication Data

US 2010/0181099 A1 Jul. 22, 2010

(51) Int. Cl.
*H02G 15/02* (2006.01)
*H01B 7/00* (2006.01)
*H01B 13/26* (2006.01)
*H01R 4/00* (2006.01)

(52) U.S. Cl. .................. 174/77 R; 174/25 R; 174/84 R; 174/88 R; 174/113 R; 156/53

(58) Field of Classification Search ................ 174/25 R, 174/74 R, 75 R, 76, 77 R, 84 R, 88 R, 88 S, 174/24, 26, 102 C, 107, 122 R, 113 A, 113 R; 156/51–53
See application file for complete search history.

(56) References Cited

U.S. PATENT DOCUMENTS

| | | | |
|---|---|---|---|
| 3,801,730 A | | 4/1974 | Nakata et al. |
| 4,110,550 A | * | 8/1978 | Di Pietro ........................ 174/19 |
| 4,466,843 A | * | 8/1984 | Shimirak ........................ 156/48 |
| 4,485,269 A | * | 11/1984 | Steinberg ..................... 174/84 R |
| 4,685,683 A | * | 8/1987 | Hall et al. ...................... 277/314 |
| 4,755,241 A | * | 7/1988 | Steinberg ........................ 156/48 |
| 4,764,232 A | * | 8/1988 | Hunter ............................. 156/48 |

(Continued)

FOREIGN PATENT DOCUMENTS

EP 2 006 969 A2 12/2008

(Continued)

OTHER PUBLICATIONS

"HVES-3-1590 15kV Class 3/C Live End Seals for PILC/VCLC Power Cable," Raychem, Tyco Electronics-Energy, PII-54695, Rev AB, PCN 707147-000, Effective Date: Mar. 1992, 9 pages.*

(Continued)

*Primary Examiner* — Timothy Thompson
*Assistant Examiner* — Sherman Ng
(74) *Attorney, Agent, or Firm* — Myers Bigel Sibley & Sajovec, PA

(57) ABSTRACT

A covered cable assembly includes a cable and a sealing assembly. The cable includes a metal sheath and a cable core. The metal sheath has a sheath terminal edge defining a sheath opening. The cable core extends through the metal sheath. The cable core includes an electrical conductor and an oil-impregnated paper insulation layer surrounding the electrical conductor. An extended cable core section of the cable core extends through the sheath opening and beyond the sheath terminal edge. The sealing assembly includes an oil barrier tube, a sealing mastic and a pressure retention tape. The oil barrier tube surrounds the extended cable core section. The sealing mastic surrounds the cable about the sheath terminal edge and overlaps portions of the metal sheath and the oil barrier tube adjacent the sheath terminal edge to effect an oil barrier seal between the metal sheath and the cable core at the sheath opening. The pressure retention tape surrounds the sealing mastic to limit displacement of the sealing mastic.

26 Claims, 15 Drawing Sheets

U.S. PATENT DOCUMENTS

| | | | | |
|---|---|---|---|---|
| 4,767,893 | A | * | 8/1988 | Ball et al. .................. 174/84 R |
| 4,788,245 | A | * | 11/1988 | Anderson .................. 524/518 |
| 4,994,632 | A | * | 2/1991 | Bosisio et al. ............ 174/121 R |
| 5,408,047 | A | * | 4/1995 | Wentzel ...................... 174/73.1 |
| 5,714,715 | A | * | 2/1998 | Sundhararajan et al. ....... 174/20 |
| 5,914,371 | A | * | 6/1999 | Mueller ...................... 525/191 |
| 6,100,472 | A | * | 8/2000 | Foss ............................ 174/77 R |
| 6,111,200 | A | * | 8/2000 | De Schrijver et al. ...... 174/74 A |
| 6,520,800 | B1 | | 2/2003 | Michelbach et al. |
| 7,072,188 | B2 | | 7/2006 | Janisch |
| 2002/0040803 | A1 | * | 4/2002 | Buyst ......................... 174/88 R |
| 2003/0207620 | A1 | | 11/2003 | Haas et al. |
| 2003/0232166 | A1 | * | 12/2003 | Buekers et al. ............. 428/41.7 |
| 2005/0111799 | A1 | * | 5/2005 | Cooke et al. ................ 385/100 |
| 2007/0027236 | A1 | * | 2/2007 | Bandyopadhyay et al. .. 524/114 |
| 2008/0277139 | A1 | | 11/2008 | Pearce |
| 2008/0314617 | A1 | * | 12/2008 | Pearce et al. .................... 174/22 |
| 2009/0065236 | A1 | * | 3/2009 | Taylor et al. ................ 174/22 R |

FOREIGN PATENT DOCUMENTS

| | | | |
|---|---|---|---|
| GB | 2113925 | A * | 8/1983 |
| WO | 2008/087151 | A1 | 7/2008 |

OTHER PUBLICATIONS

"HVS-T-1590S 15kV Class Trifurcating Splice for 3/C/ PILC to 3 1/C PILC Power Cables," Raychem, Tyco Electronics-Energy, PII-54923, Rev AC, PCN 670793-000, Effective Date: Jan. 25, 1999, 14 pages.*

"HVSY-1582D 15kV Class Splice for PILC-to-PILC or PILC-to-Extruded Dielectric (Poly/EPR) Power Cable," Raychem, Tyco Electronics-Energy, PII-54866, Rev Ad, PCN 528421-000, Effective Date: Mar. 14, 2000, 14 pages.*

U.S. Appl. No. 12/122,048, filed May 16, 2008, titled "Cover Assembly for Cables and Electrical Connections and Methods for Using the Same," 27 pages.

Notification Concerning Transmittal of International Preliminary Report on Patentability (Chapter I of the Patent Cooperation Treaty) in corresponding PCT Application No. PCT/US2010/020308 mailed Jul. 28, 2011, 12 pages.

Raychem Corporation: "HVS-T-1590S 15kV Class Trifurcating Splice for 3/C PILC to 3 1/C PILC Power Cables" Jan. 25, 1999, Raychem Corporation Electrical Products, 8000 Purfoy Road, Fuquay-Varina, NC 27559, 14 pages.

Notification of Transmittal of the International Search Report and the Written Opinion of the International Searching Authority, or the Declaration in corresponding PCT Application No. PCT/US2010/020308 mailed May 16, 2011, 17 pages.

* cited by examiner

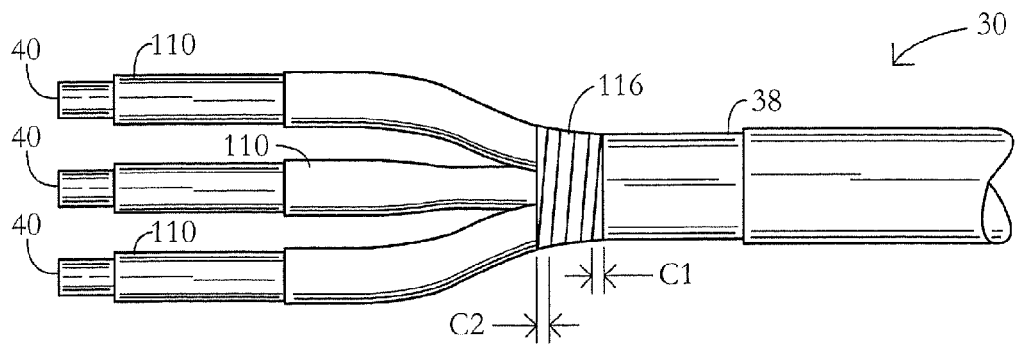
FIG. 4
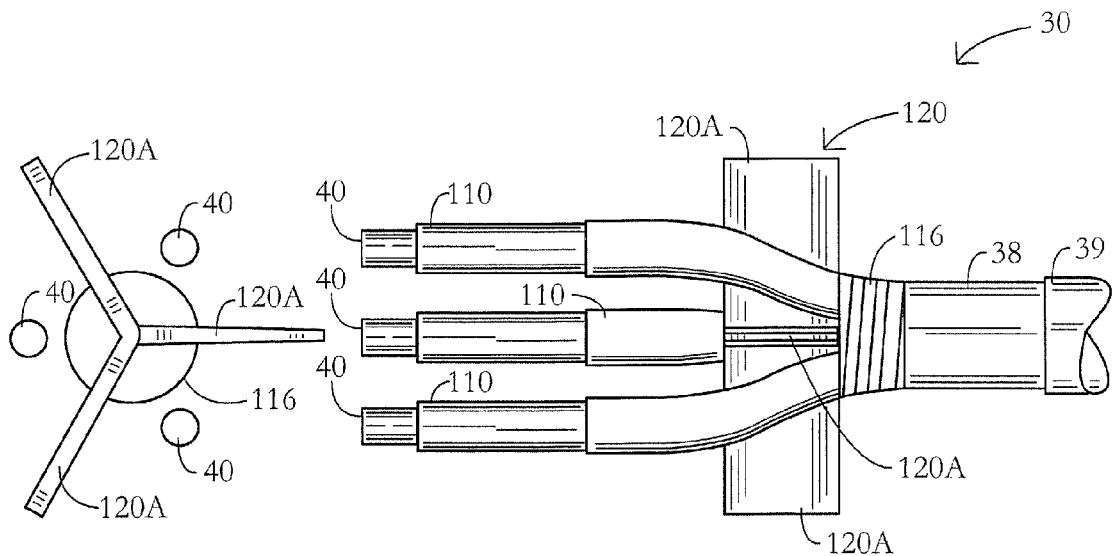
FIG. 5B  FIG. 5A
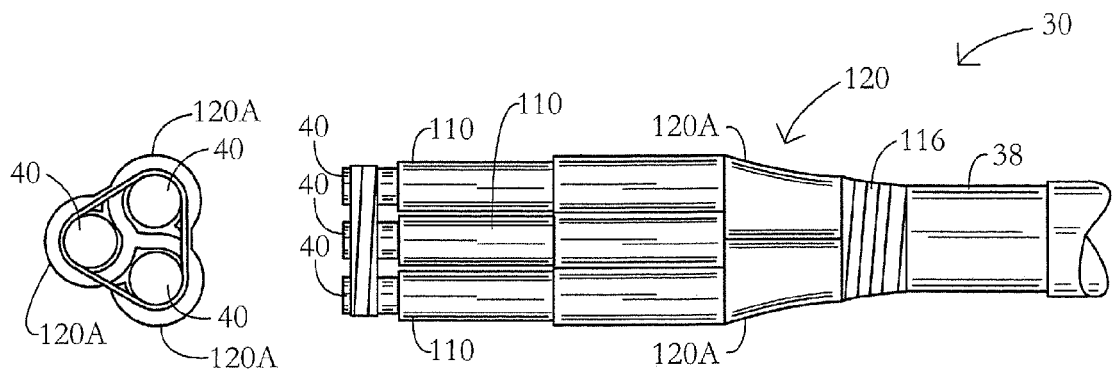
FIG. 6B  FIG. 6A

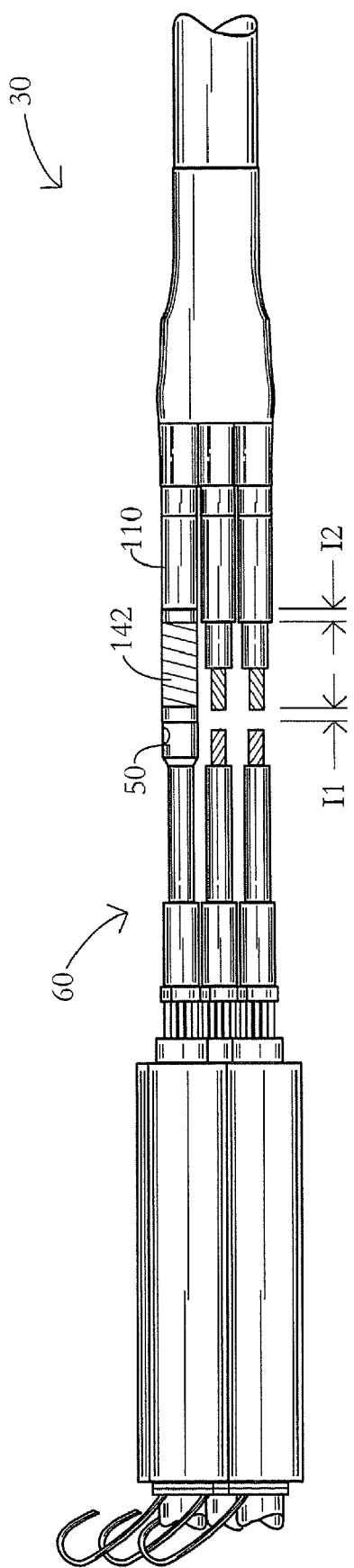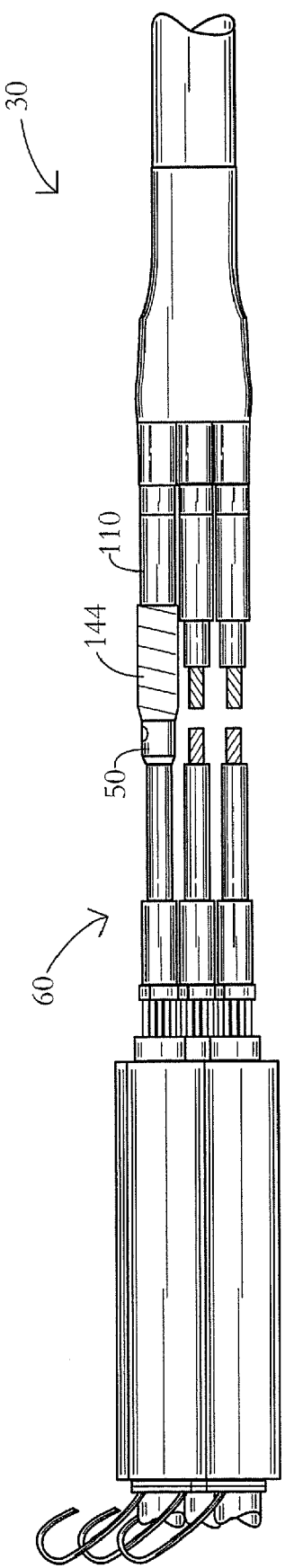
FIG. 15
FIG. 16

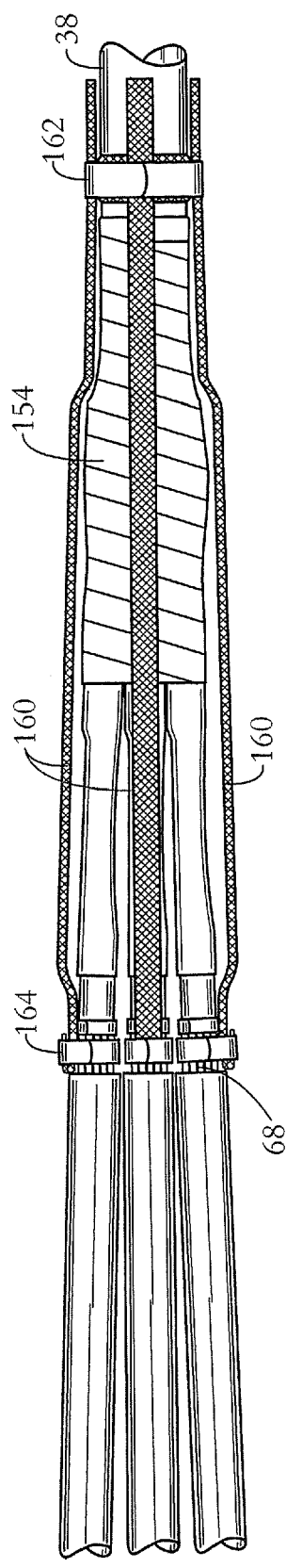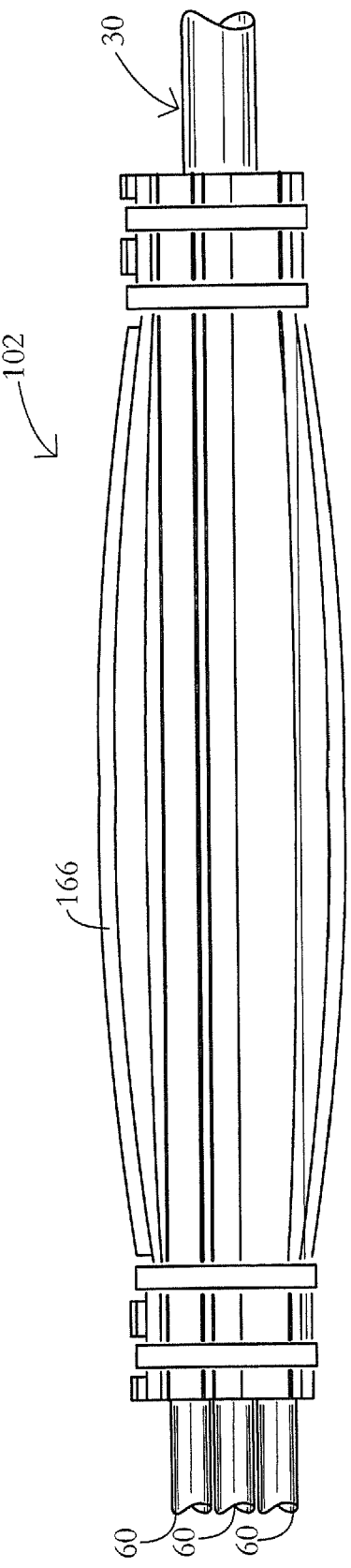
FIG. 20
FIG. 21

COVERED CABLE ASSEMBLIES AND METHODS AND SYSTEMS FOR FORMING THE SAME

FIELD OF THE INVENTION

The present invention relates to electrical cables and, more particularly, to covers for electrical cables having oil-impregnated paper insulation.

BACKGROUND OF THE INVENTION

Covers are commonly employed to protect or shield electrical power cables and connections (e.g., low voltage cables up to about 1000V and medium voltage cables up to about 65 kV). One application for such covers is for splice connections of metal-sheathed, paper-insulated cables such as paper-insulated lead cable (PILC). A PILC typically includes at least one conductor surrounded by an oil-impregnated paper insulation layer, and a lead sheath surrounding the conductor and insulation layer. Alternatively, the metal sheath may be formed of aluminum. In some cases, it is necessary to contain the oil. It is known to use a heat shrinkable sleeve made of a polymer that does not swell when exposed to the oil. Examples of such heat shrinkable sleeves include heat shrinkable oil barrier tubes (OBT) available from Tyco Electronics Corporation of Fuquay-Varina, NC. The sleeve is placed over the oil impregnated paper and heat is applied to contract the sleeve about the insulation layer. Mastic or other sealant material may be used at each end of the sleeve to ensure an adequate seal and containment of the oil.

SUMMARY OF THE INVENTION

According to embodiments of the present invention, a covered cable assembly includes a cable and a sealing assembly. The cable includes a metal sheath and a cable core. The metal sheath has a sheath terminal edge defining a sheath opening. The cable core extends through the metal sheath. The cable core includes an electrical conductor and an oil-impregnated paper insulation layer surrounding the electrical conductor. An extended cable core section of the cable core extends through the sheath opening and beyond the sheath terminal edge. The sealing assembly includes an oil barrier tube, a sealing mastic and a pressure retention tape. The oil barrier tube surrounds the extended cable core section. The sealing mastic surrounds the cable about the sheath terminal edge and overlaps portions of the metal sheath and the oil barrier tube adjacent the sheath terminal edge to effect an oil barrier seal between the metal sheath and the cable core at the sheath opening. The pressure retention tape surrounds the sealing mastic to limit displacement of the sealing mastic.

According to method embodiments of the present invention, a method for forming a covered cable assembly includes providing a cable including: a metal sheath having a sheath terminal edge defining a sheath opening; and a cable core extending through the metal sheath, the cable core including an electrical conductor and an oil-impregnated paper insulation layer surrounding the electrical conductor; wherein an extended cable core section of the cable core extends through the sheath opening and beyond the sheath terminal edge. The method further includes: mounting an oil barrier tube on the extended cable core section such that the oil barrier tube surrounds the extended cable core section; applying a sealing mastic to the cable such that the sealing mastic surrounds the cable about the sheath terminal edge and overlaps portions of the metal sheath and the oil barrier tube adjacent the sheath terminal edge to effect an oil barrier seal between the metal sheath and the cable core at the sheath opening; and applying a pressure retention tape to surround the sealing mastic to limit displacement of the sealing mastic.

According to further embodiments of the present invention, a cover system for covering a cable including a metal outer sheath and multiple cable cores, each cable core including an electrical conductor surrounded by an oil-impregnated paper insulation, includes: a plurality of oil barrier tubes each configured to be mounted on a respective one of the cable cores; a sealing mastic to be mounted on the oil barrier tubes and the metal sheath to effect an oil barrier seal between the metal sheath and the cable cores at an opening of the metal sheath; an elastomeric breakout having a main tubular body to receive the metal sheath and a plurality of tubular fingers integral with the main tubular body and configured to receive respective ones of the cable cores; an insert member, the insert member having a plurality of legs configured to be interposed between the first, second and third tubular fingers; and a pressure retention tape to surround the breakout and the insert member to limit displacement of the sealing mastic.

According to embodiments of the present invention, a covered cable assembly includes a cable, an electrically conductive connector, and a sealing assembly. The cable includes: a metal sheath having a sheath terminal edge defining a sheath opening; and a cable core extending through the metal sheath, the cable core including an electrical conductor and an oil-impregnated paper insulation layer surrounding the electrical conductor. An extended cable core section of the cable core extends through the sheath opening and beyond the sheath terminal edge. The electrically conductive connector is mounted on the electrical conductor. The sealing assembly includes an oil barrier tube, a connector mastic, and a connector pressure retention tape. The oil barrier tube surrounds the extended cable core section. The connector mastic surrounds and engages each of the connector and the oil barrier tube adjacent an interface between the connector and the oil barrier tube to effect an oil barrier seal about the cable core. The connector pressure retention tape surrounds the cable and includes first and second opposed end portions extending axially beyond the connector mastic. The first end portion overlaps and adheres to the connector and the second end portion overlaps and adheres to the oil barrier tube.

BRIEF DESCRIPTION OF THE DRAWINGS

FIGS. 1-21 illustrate methods for forming a covered cable assembly according to embodiments of the present invention using a cover system according to embodiments of the present invention.

DETAILED DESCRIPTION OF EMBODIMENTS OF THE INVENTION

Figure 1:
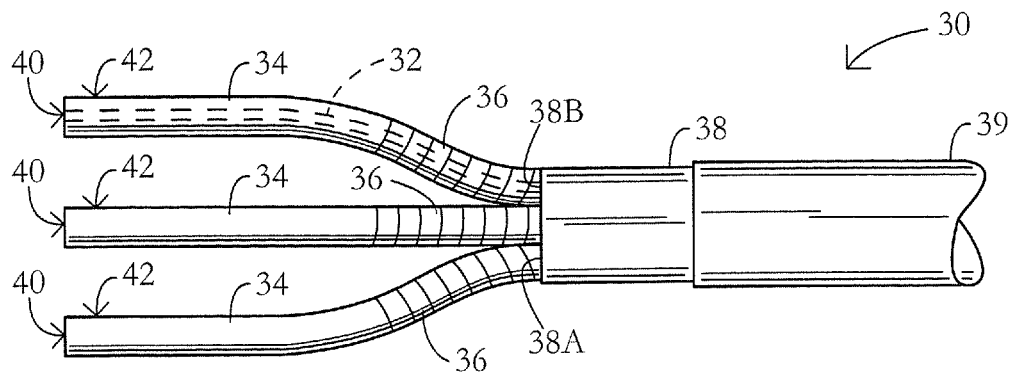

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "cold shrink" or "cold shrink cover" means that the cover or component can be shrunk or contracted about a substrate (e.g., a cable) without requiring the use of applied heat.

With reference to FIG. 21, a cover system 101 according to some embodiments of the present invention is shown therein. The cover system 101 can be used to form a cover assembly 102 as shown in FIG. 21. The cover assembly 102 can be a cold-applied transition joint about a connection between an oil-containing cable 30 having a metal sheath and an oil-impregnated paper insulation and a polymeric cable 60, as discussed in more detail below, to form a covered cable assembly 103 (FIG. 21). In some embodiments, the cover system 101 is provided as a pre-packaged kit of components for subsequent assembly by an installer (e.g., a field installer) using a method as described herein.

The cable 30 (FIG. 1) as illustrated is a three-phase cable including three electrical conductors 32, which may be formed of any suitable material such as copper, and may be solid or stranded. Each conductor 32 is surrounded by a respective oil-impregnated paper insulation layer 34. The oil impregnating each layer 34 may be any suitable oil such as a mineral oil. A respective metal screen 36 may surround each paper layer 34. A metal sheath 38 surrounds the three conductors 32, collectively. According to some embodiments, the metal sheath 38 is a lead sheath and the cable 30 may be commonly referred to as a paper-insulated lead cable (PILC). According to other embodiments, the metal sheath 38 is formed of aluminum. A polymeric jacket 39 surrounds the metal sheath 38.

The polymeric cable 60 (FIG. 13) includes three conductors 62, each surrounded by a respective polymeric insulation 64 and a respective semiconductive elastomer 66. A metal shield layer 68 collectively surrounds the conductors 62. A polymeric jacket 69 surrounds the shield layer 68.

The cover system 101 includes three tubular oil barrier tubes (OBTs), an electrically conductive metal mesh 114, a dual layer mastic tape 116, a vinyl tape 118, an oil barrier mastic (OBM) insert 120, mastic patches 122, 124, 126, a breakout 130 (initially mounted on a main holdout 133 and three finger holdouts 135), a dual layer mastic tape 140, a connector pressure retention tape 142, a vinyl tape 144, a tubular cold shrink joint (CSJ) body 146 (initially mounted on a holdout 147), a spacer or insert member 150, and a breakout pressure retention tape 154.

Each OBT 110 (FIG. 2) maybe formed of any suitable material. According to some embodiments, each OBT 110 is formed of an electrically insulative material and may include an electrically conductive semiconductive layer 110A. According to some embodiments, each OBT is formed of an electrically expandable material, which may be an elastomeric material. Suitable materials for the OBTs may include EPDM, neoprene, butyl or polyurethane. Each OBT 110 may be initially mounted on a holdout (not shown). The holdouts may be formed of any suitable material. According to some embodiments, the holdouts are formed of plastic with a surface lubricant to assist in removal from the OBT 110.

The breakout 130 (FIGS. 11, 12 and 18C) includes a main tubular body 132 and three circumferentially distributed tubular fingers 134 integral with the main body 132. The breakout 130 may be formed of any suitable material. According to some embodiments, the breakout 130 is formed of an elastically insulative material. According to some embodiments, the breakout 130 is formed of an elastically expandable material such as an elastomeric material. Suitable materials may include EPDM, neoprene, butyl or polyurethane. The holdouts 133, 135 may be formed of any suitable material. According to some embodiments, the holdouts 135 are formed of plastic with a release lubricant. According to some embodiments, the holdout 133 is a spirally wound holdout.

Each of the dual layer mastic tapes 116 (FIG. 6A), 140 (FIG. 14) includes an inner layer of sealing mastic carried by an outer substrate or layer of an elastic material. The inner layer is deformable, resistant to chemical attack from oil, and resistant to migration of oil therethrough. The outer layer can be elastically elongated. Each tape 116, 140 is a self-amalgamating tape such that, when wrapped upon itself, the inner layer of mastic will fuse with itself. Suitable dual layer mastic tapes may include tapes as disclosed in U.S. Patent Application Publication No. 2008/0277139 A1, the disclosure of which is incorporated herein by reference. Suitable dual layer mastic tapes may include the EPPA-225 tape available from Tyco Electronics Corporation.

The connector pressure retention tape 142 (FIG. 15) may include any suitable self-amalgamating sealing tape. According to some embodiments, the connector pressure retention tape 142 includes a silicone tape impregnated with a substrate (in some embodiments, a fabric mesh) that limits the permitted extent of elongation of the tape 142. In some embodiments, elongation of the tape 142 is limited to from about 5 to 25%. Suitable connector pressure retention tapes may include EXRM-3020 tape available from Tyco Electronics Corporation The OBM insert 120 (FIGS. 5A and 5B) may be formed of any suitable sealing mastic. According to some embodiments, the OBM insert 120 is formed of nitrile rubber, epichlorhydrin rubber, or fluorinated rubber. The OBM insert 120 includes three generally planar walls or legs 120A joined at their inner ends and circumferentially spaced apart. Suitable mastic materials include S1340 mastic available from Tyco Electronics Corporation.

The mastic patches 122, 124, 126 (FIGS. 7-9) may be formed of any suitable sealing mastic and, according to some embodiments, are formed of the same material as the OBM insert 120. The mastic patches 122, 124, 126 are generally planar members.

The CSJ body 146 (FIGS. 17 and 18A) may be of any suitable construction and materials. The CSJ body 146 may include a tubular elastomeric, electrically insulative layer and one or more internal electrically semiconductive layers, for example, as known in the art for controlling electrical stresses, providing electrical shielding and bridging the electrically semi-conductive layers 36, 66 of the cables 30, 60. Suitable materials for the CSJ body 146 may include silicone rubber, for example. The CSJ body 146 can be initially mounted on a holdout 147.

The spacer or insert member 150 (FIGS. 18A-18C) may be formed of any suitable resiliently deformable material. According to some embodiments, the insert member 150 is formed of an elastomeric material. Suitable elastomeric materials may include ethylene-propylene-diene-monomer (EPDM) rubber, silicone rubber, butyl rubber or nitrile rubber. According to some embodiments, the insert member 150 has a modulus of elasticity in the range of from about 30 to 100 psi and, in some embodiments, from about 68 to 76 psi. The insert member 150 includes three generally planar legs 152 joined along their inner ends and circumferentially spaced apart.

The breakout pressure retention tape 154 may be any suitable self-amalgamating tape. According to some embodiments, the tape 154 is a fusible silicone tape. In some embodiments, the tape 154 has a maximum elastic elongation in the range of from about 50 to 600% and, in some embodiments, from about 50 to 200%. Suitable tapes for the tape 154 may include MVFT tape available from Tyco Electronics Corporation, for example.

The construction of the cover assembly 102 may be further appreciated in view of methods for forming the cover assembly 102 according to embodiments of the present invention, as discussed in further detail below. However, it will be appreciated that, in some embodiments, certain of the steps and components disclosed hereinbelow may be altered or omitted in accordance with further embodiments of the invention.

Figure 13:
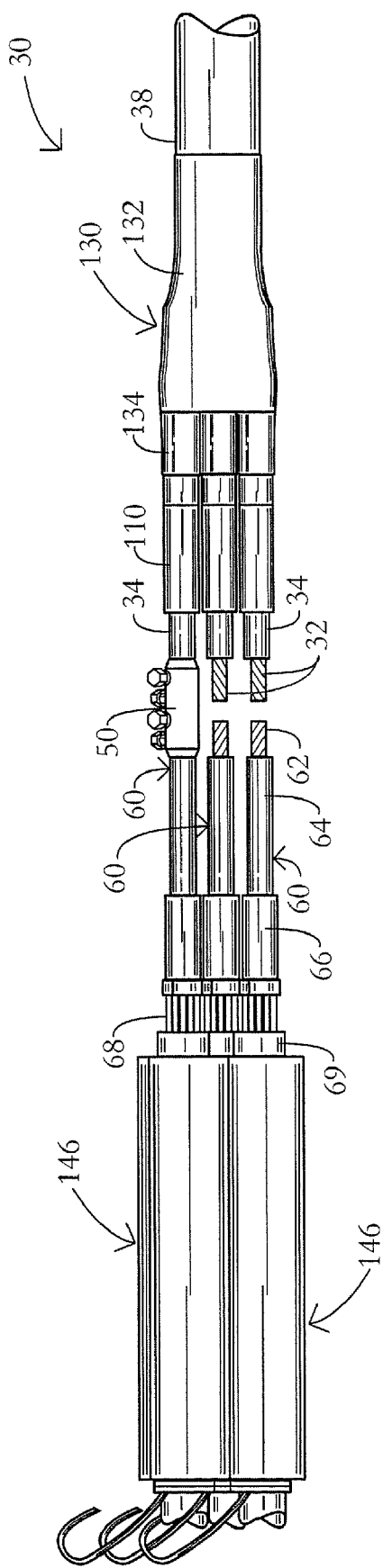

With reference to FIG. 1, the cable 30 is prepared by progressively trimming back or removing end sections of the jacket 39, the metal sheath 38, and the metal screen 36 as shown. The paper insulation 34 of each conductor 32 may also be trimmed back or may be subsequently trimmed prior to installing the connectors 50 as shown in FIG. 13. Each conductor 32 and the paper insulation 34 surrounding the conductor 32 may be referred to herein as a cable core 40. The metal sheath 38 has a terminal edge 38A defining an end opening 38B through which extended sections 42 of the three cable cores 40 extend.

Figure 2:
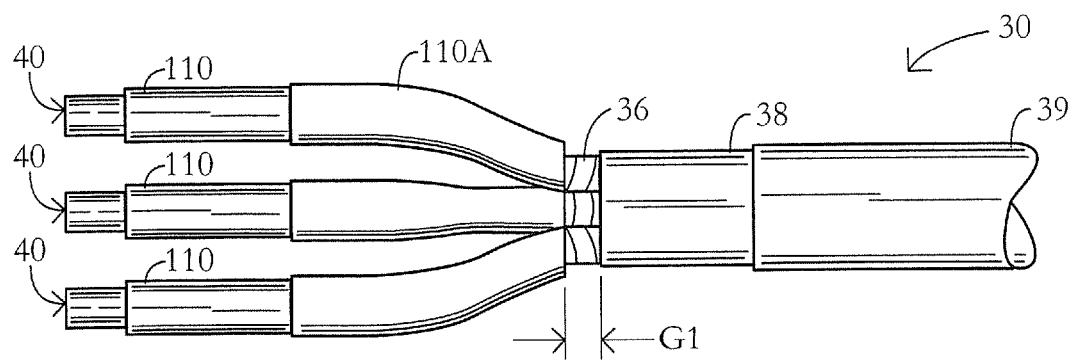

As shown in FIG. 2, an OBT 110 is mounted on each cable core 40 such that a gap G1 is defined between the adjacent edges of the OBT 110 and the metal sheath 38. According to some embodiments, the gap G1 has a length of between about 0.8 inch (20 mm) and 1.2 inches (30 mm).

Figure 3:
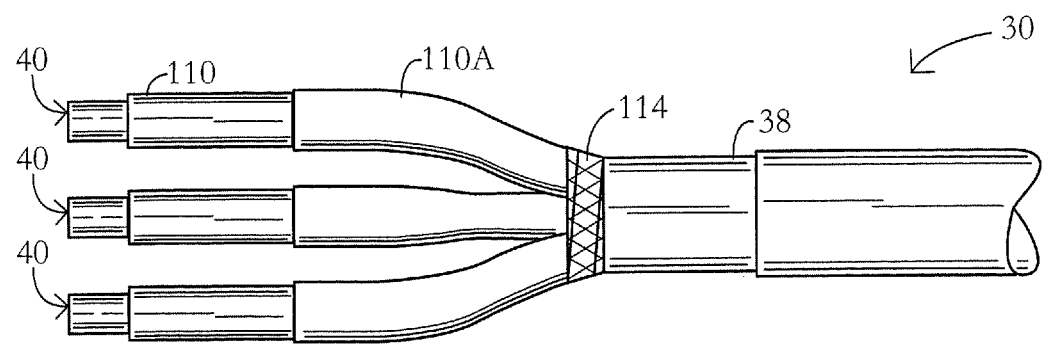

As shown in FIG. 3, the metal sheath 114 is wrapped about the gap G1 such that the metal mesh 114 contacts the exposed portions of the metal screens 36 and overlaps and contacts the metal sheath 38 and the semiconductive section 110A of each OBT 110.

Referring to FIG. 4, the dual layer mastic tape 116 is wrapped about the metal mesh 114 with its mastic layer down (i.e., inward). The tape 116 overlaps and contacts each of the metal sheath 38 and the OBT semiconductive section 110A. According to some embodiments, the tape 116 overlaps the metal sheath 38 a distance C1 beyond the metal mesh 114 in the range of from about 0.2 inch (5 mm) to 0.75 inch (19 mm). According to some embodiments, the tape 116 overlaps the OBT section 110A a distance C2 beyond the metal mesh 114 in the range of from about 0.25 inch (19 mm) to 0.5 inch (13 mm). According to some embodiments, the tape 116 is elastically elongated.

With reference to FIGS. 5A and 5B, the OBM insert 120 is mounted in the crotch of the cable cores 40 such that each leg 120A is interposed between respective adjacent ones of the cable cores 40. Then, as shown in FIGS. 6A and 6B, each 120A is wrapped clockwise around the adjacent cable core 40 such that the free edge of each leg 120A merges with the adjacent leg 120A.

Figure 7:
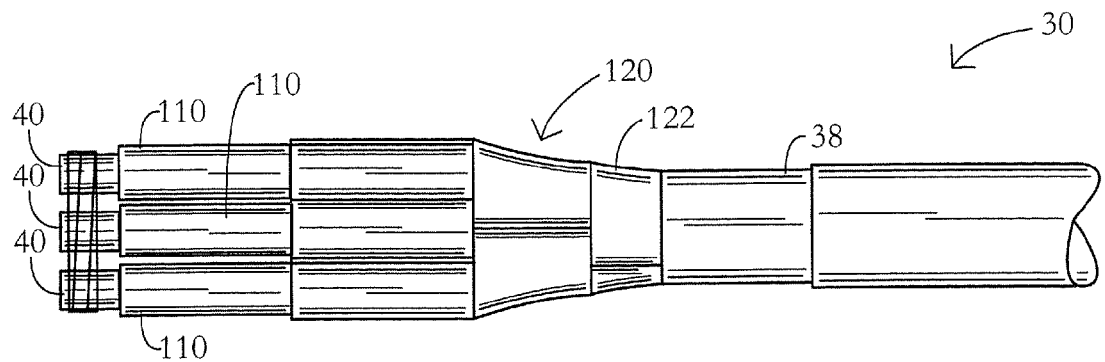
Figure 8:
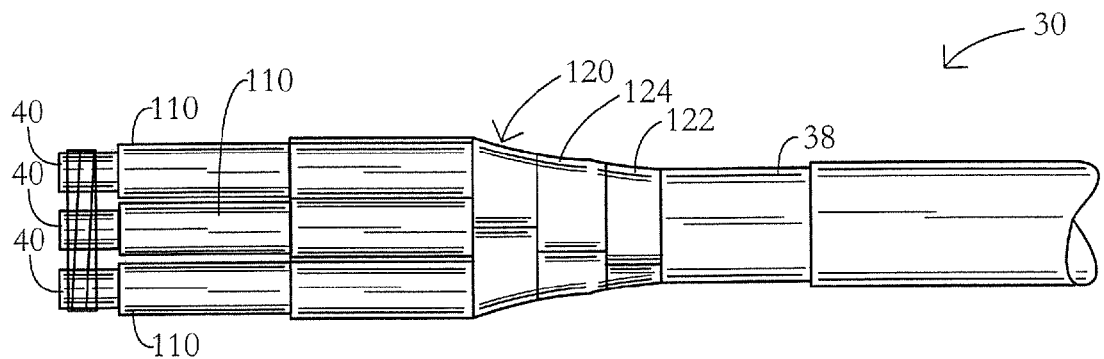
Figure 9:
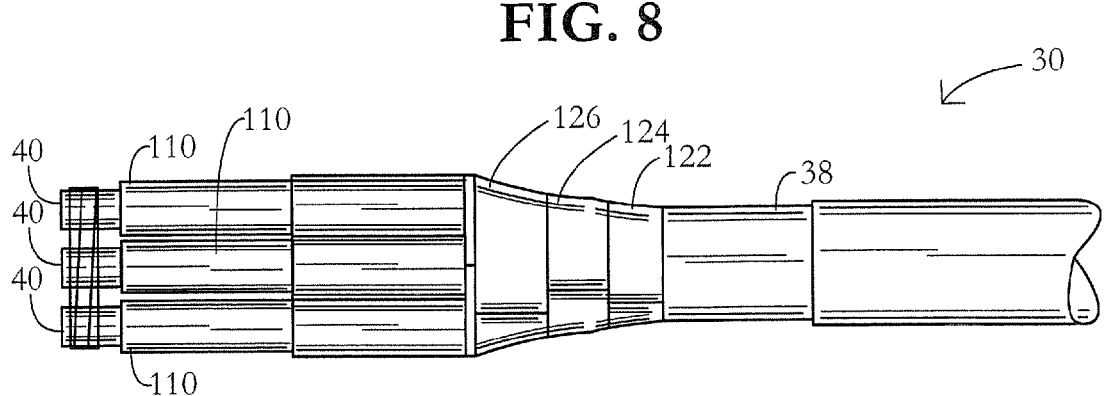
Figure 10:
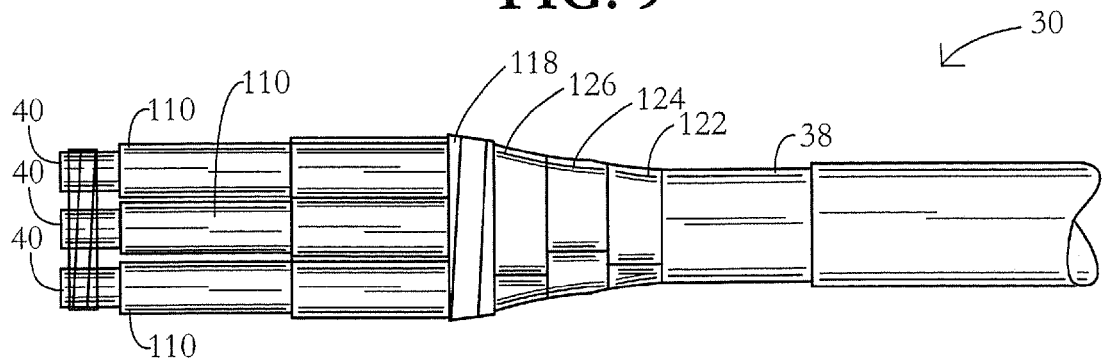

Referring to FIG. 7, the mastic patch 122 is wrapped about the cable 30 with its inner edge butted to the terminal edge 38A of the metal sheath 38. The mastic patch 124 is then wrapped about the cable 30 such that it overlaps each of the mastic patch 122 and the OBM insert 120 (FIG. 8). The mastic patch 126 is then wrapped about the cable 30 such that it overlaps the mastic patch 124 and further overlaps the OBM insert 120 (FIG. 9). The vinyl tape 118 is then wrapped about the distal edge of the mastic patch 126 as shown in FIG. 10. According to some embodiments, the mastic patch 122 overlaps the metal sheath 38 a distance D (FIG. 7) beyond the tape 116 in the range of from about 0.4 inch (10 mm) to 0.6 inch (15 mm). In some embodiments, the mastic patches 124 and 126 overlap the mastic patches 122 and 124, respectively, by a distance of between about 0.4 inch (10 mm) and 0.6 inch (15 mm).

Figure 11:
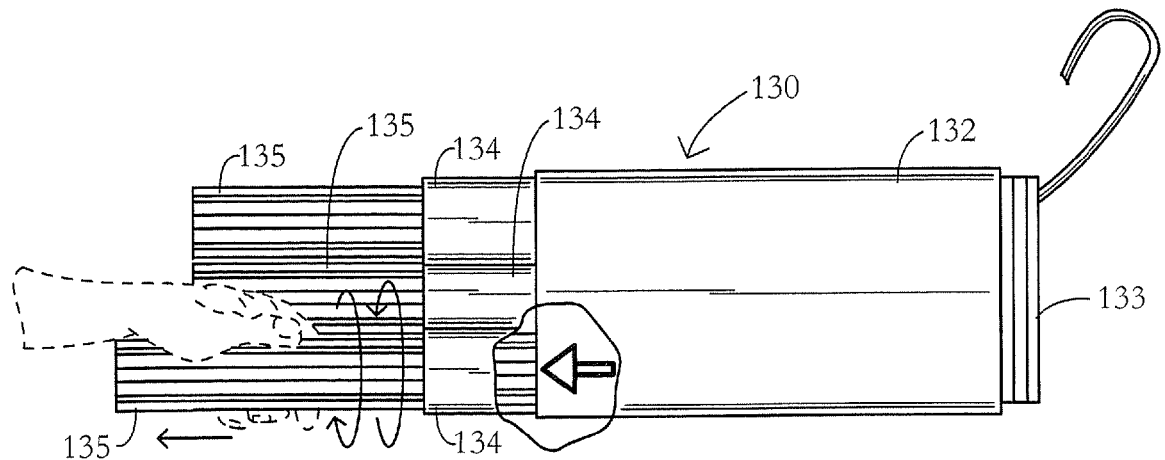

The finger holdouts 135 can be pre-activated by twisting the holdouts 135 in the fingers 134 of the breakout 130 as shown in FIG. 11 but not yet withdrawing the holdouts 135. Twisting the holdouts 135 distributes the lubricant between the holdouts 135 and the fingers 134 so that the holdouts 135 can be more easily slid axially with respect to the fingers 134.

The breakout 130, with the holdouts 133, 135 still installed therein, is slid over the cable cores 40 such that the cable cores 40 extend through the fingers 134. The vinyl tape 118 helps to prevent the breakout 130 from being caught on or disrupting the mastic patch 126. The breakout 130 is slid into the crotch of the cable 30 as far as possible and the pre-activated finger holdouts 135 may be partially axially displaced or ejected as a result. In this position, the main body 132 of the breakout 130 overlaps the metal sheath 38.

Figure 12:
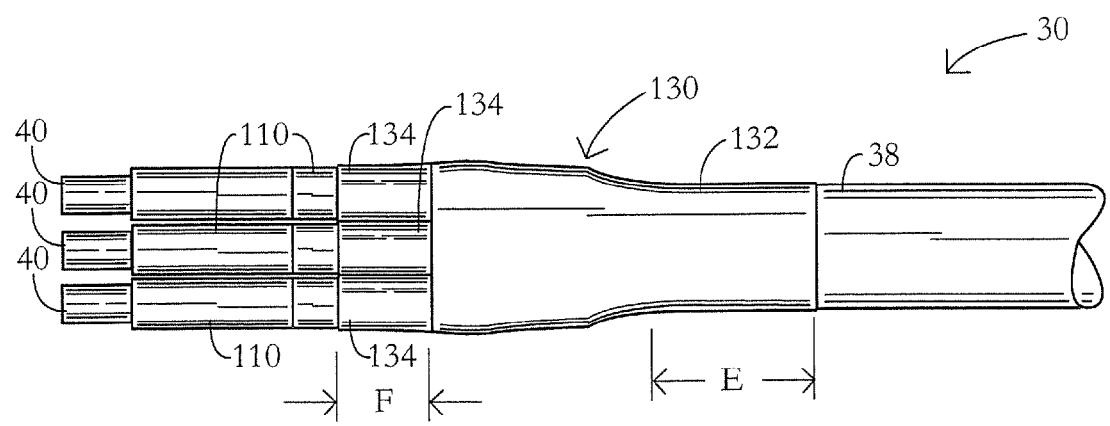

The finger holdouts 135 are then removed, permitting the fingers 134 to contract and capture respective ones of the cable cores 40. Then, the holdout 133 is removed from the main body 132 of the breakout 130, permitting the main body 132 to contract and capture the crotch of the cable 30 and an end portion of the metal sheath 38 as shown in FIG. 12.

The following procedure can be executed for each of the cable cores 40 in turn. The paper insulation 34 of a selected cable core 40 can be trimmed back as shown in FIG. 13 to expose a terminal section of the conductor 32. The conductor 32 is thereafter mechanically and electrically connected to a corresponding conductor 32 of the polymeric cable 60 by a connector 50. In some embodiments, the connector 50 is an oil stop connector having a pair of opposed bores to receive respective ones of the conductors 32, 62 and being fluidly separated from one another by a separator wall. Shear bolts 52 may be provided to secure the connector 50 to the conductors 32, 62.

Figure 14:
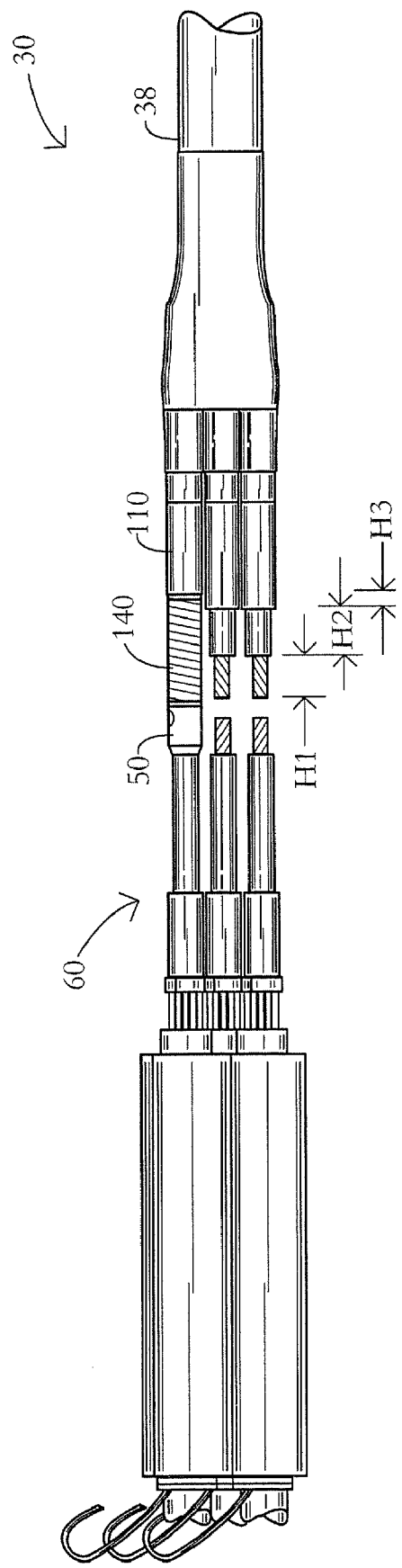

The dual layer mastic tape 140 is then wrapped about the cable core 40 and the connector 50 with the mastic side down (FIG. 14). The tape 140 is wound onto the cable core 40 and the connector 50 such that the tape 140 overlaps each of the cable core 40 and the connector 50. According to some embodiments, the tape 140 overlaps the connector 50 by a distance H1 (FIG. 14) in the range of from about 1.8 inches (45 mm) to 2.2 inches (56 mm). According to some embodiments, the tape 140 overlaps the OBT 110 by a distance H3 in the range of from about 0.4 inch (10 mm) to 0.6 inch (15 mm). In some embodiments, the tape 140 is elastically elongated so that, once applied to the cable 30, the tape 140 continues to persistently apply a radially compressive load to the underlying components (i.e., a hoop stress is retained in the tape 140).

As shown in FIG. 15, the connector pressure retention tape 142 is then wrapped over the connector 50, the cable core 40, and the tape 140. In some embodiments, two complete wraps are made of the tape 142 about the cable core 40 and the connector 50. According to some embodiments, the tape 142 extends beyond the tape 140 on either end thereof and overlaps, engages and adheres to the connector 50 and the OBT 110. The tape 142 can thereby provide a gasket-type seal to prevent, limit or inhibit displacement or extrusion of the mastic of the tape 140 away from the joint between the connector 50 and the OBT 110 under internal pressure from the oil of the cable 30. In some embodiments, the tape 142 is elastically elongated such that it applies a persistent radially compressive load on the underlying components after installation. According to some embodiments, the tape 142 overlaps each of the connector 50 and the OBT 110 a distance I1, I2 (FIG. 15) in the range of from about 0.8 inch (20 mm) to 1.2 inches (30 mm). According to some embodiments, the tape 142 applies a persistent radially compressive load in the range of from about 40 to 26 psi.

The vinyl tape 144 is then wrapped over the connector pressure retention tape 142 as shown in FIG. 16.

Figure 17:
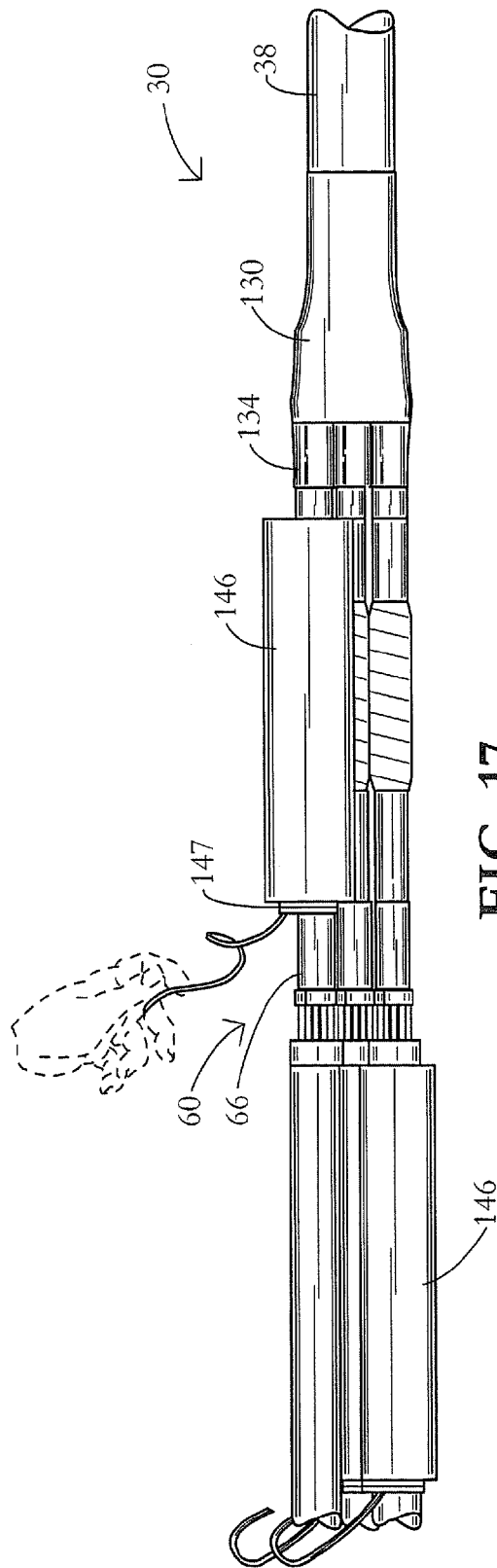

FIG. 17 shows the cable 30 with all three cable cores 40 having been connected to their associated polymeric cable 60 and prepared with the tapes 140, 142, 144. A CSJ body 146, which may have been previously parked on the associated polymeric cable 60 is slid into place over each connector 50. The holdout 147 is removed to permit the CSJ body 146 to contract about and sealingly engage the polymeric insulation 64 of the polymeric cable 60 and the OBT 110 (at a distance from the terminal end of the breakout finger 134). The CSJ body 146 thus spans and encapsulates the connector 50 and the tapes 140, 142, 144. A section 110B of the OBT 110 extending between the adjacent ends of the CSJ body 146 and the breakout finger 134 remains exposed.

Figure 18A:
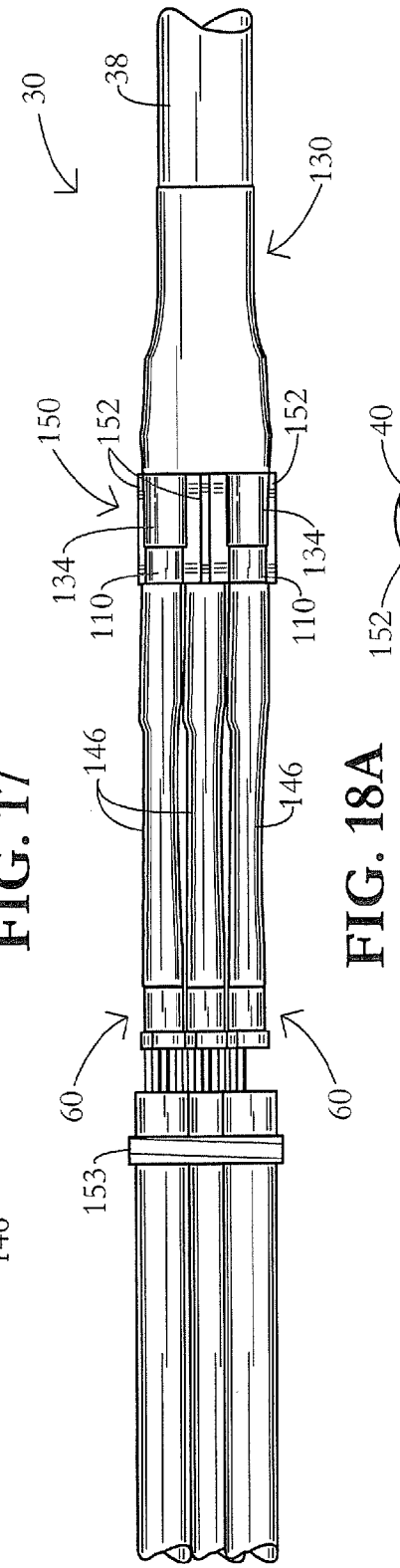
Figure 18B:
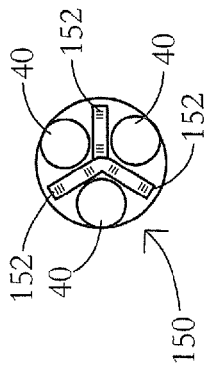
Figure 18C:
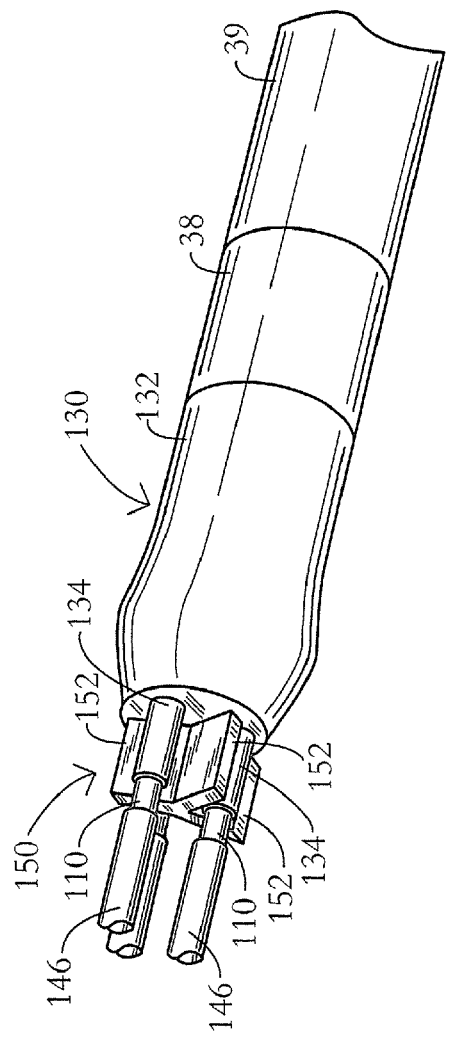

Once CSJ bodies 146 have been installed on all three cable cores 40 as shown in FIG. 18A, the insert member 150 is inserted into the crotch of the PILC cable 30 and the breakout 130 as shown in FIGS. 18A-18C. The legs 152 of the insert member 150 are interposed between adjacent ones of the fingers 134 and extend from the bases of the fingers 134 (i.e., the outer end of the main body 132) to closely adjacent the proximal ends of the CSJ bodies 146. A vinyl tape 153 may be wrapped about the cables 60 to temporarily secure the insert member 150 in place.

Figure 19A:
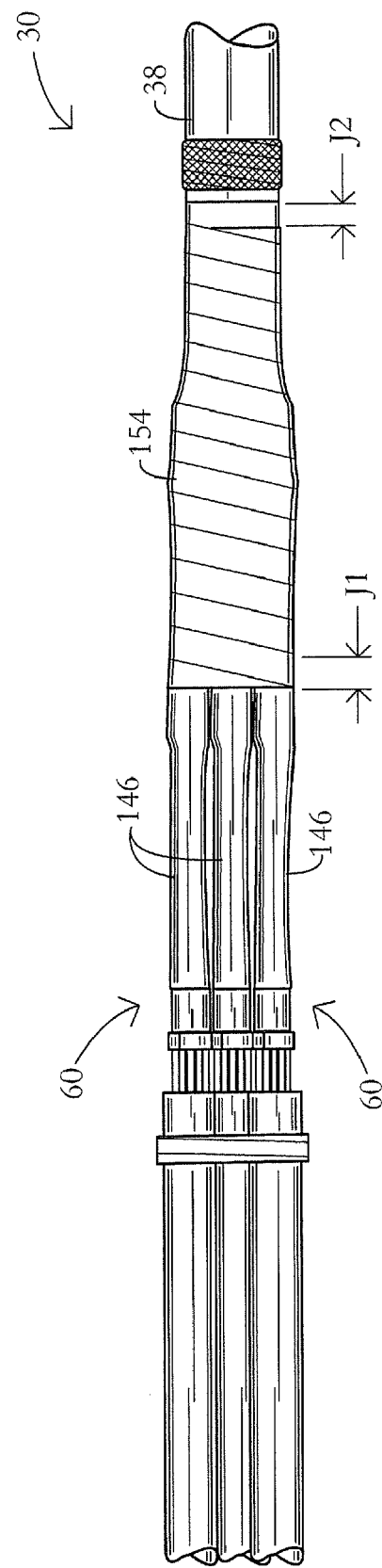
Figure 19B:
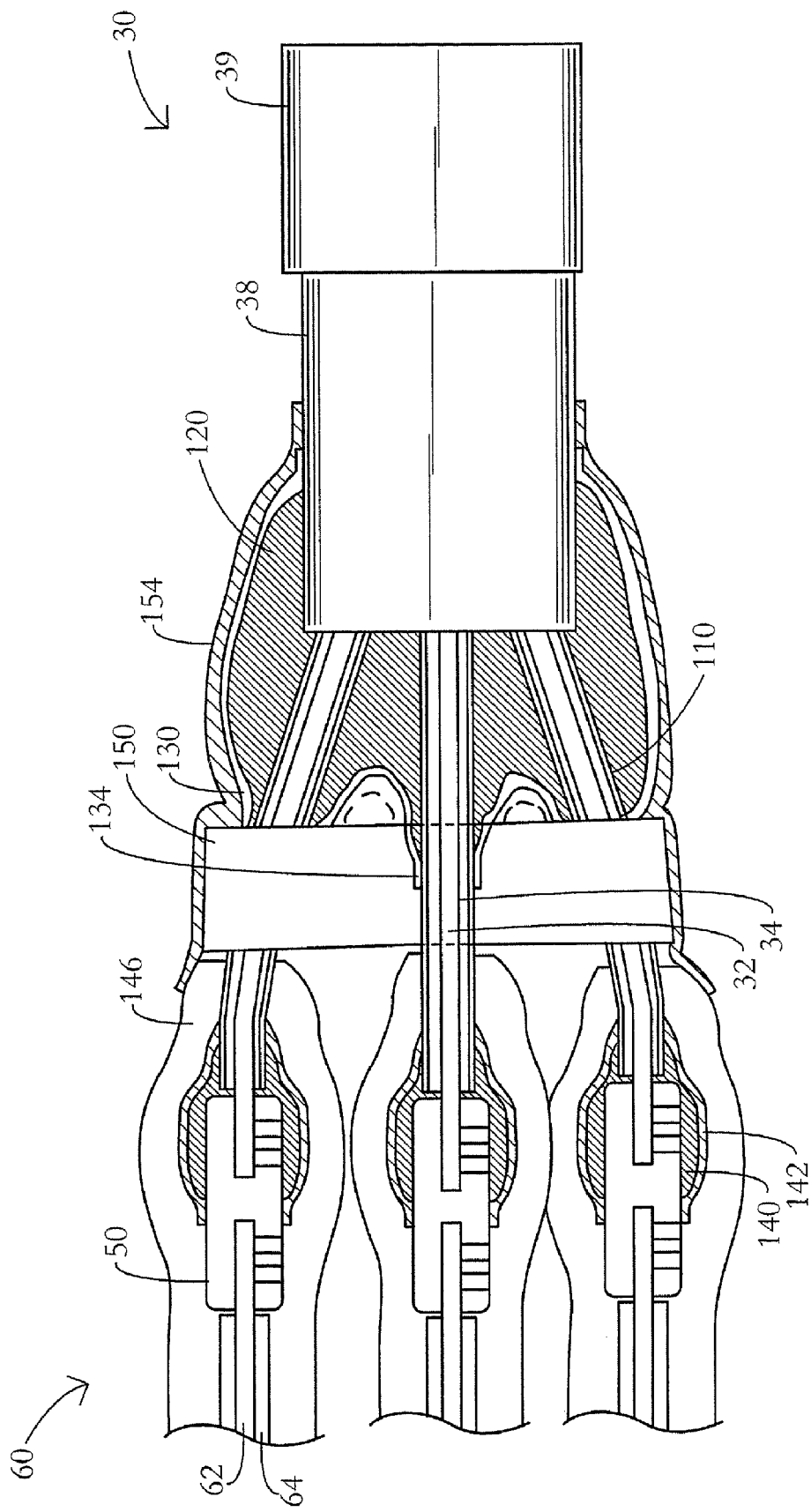

The breakout pressure retention tape 154 is then wrapped about the components 50 (collectively), the cable cores 40 (collectively), and an end portion of the metal sheath 38 as shown in FIGS. 19A and 19B (FIG. 19B is an enlarged, fragmentary, cross-sectional view). The tape 154 overlaps, engages and adheres to an end portion of each CSJ body 146 as well as the end portion of the metal sheath 38 and continuously spans therebetween. In some embodiments, the tape 154 overlaps the CSJ bodies 146 a distance J1 (FIG. 19A) in the range of from about 0.5 inch (13 mm) to 3 inches (75 mm). According to some embodiments, the tape 154 overlaps the metal sheath 38 beyond the breakout 130 by a distance J2 (FIG. 19A) in the range of from about 0.5 inch (13 mm) to 3 inches (75 mm). The tape 154 provides a gasket-type seal to prevent, limit or inhibit displacement or extrusion of the mastic 116, 120, 122, 124, 126 out of the breakout 130 and away from the joint between the metal sheath 38 and the cable cores 40 under internal pressure from the oil of the cable 30. The tape 154 is elastically elongated so that, once applied to the cable 30, the tape 154 continues to persistently apply a radially compressive load to the underlying components (i.e., a hoop stress is retained in the tape 154.) This compressive loading deforms the insert member 150 into intimate and compressive contact with and about the breakout fingers 134. In this manner, the engagement and thereby the seal between each finger 134 and its associated OBT 110 are maintained and reinforced. The insert member 150 remains solid but conforms around the fingers 134 to prevent migration of mastic contained in the breakout 130 through the interface between the cable cores 40 and the fingers 134. The secured insert member 150 also serves to resist axial displacement of the breakout 130 away from the metal sheath 38. The tape 154 also serves to reinforce the exposed section 110B of each OBT 110 to resist bulging of the section 110B due to internal pressure from the oil of the cable 30. According to some embodiments, the tape 154 applies a persistent radially compressive load in the range of from about 6 to 16 psi.

In the foregoing manner, a reliable and robust oil stop seal can be formed at the joint between the metal sheath 38 and the cable cores 40 and at the joint between each cable core 40 and its connector 50. The cover assembly 102 can serve to retain the oil in the PILC cable 30 even when relatively high oil internal pressures are induced, such as by increases in temperature or placement of the connection at lower elevation than other parts of the cable 30.

The covered cable assembly 10 can thereafter be grounded, shielded and re-jacketed in known manner, for example. Referring to FIG. 20, grounding braids 160 can be connected to the shield layers 68 of the polymeric cables 60 and the metal sheath 30 by clamps 162, 164 as shown therein, for example. Metal shielding mesh (not shown) can be wrapped from the clamps 162 to the clamps 164. A sealing breakout boot (not shown) may be installed on the joint between the shielding mesh and the polymeric cables 60. The entire joint assembly, including the cover assembly 102, can be covered by a re-jacketing sleeve 166 (FIG. 21), which overlaps the jacket 39. Suitable re-jacketing sleeves may include the Gel-Wrap Rejacketing Sleeve available from Tyco Electronics Corporation, for example.

Figure 32:
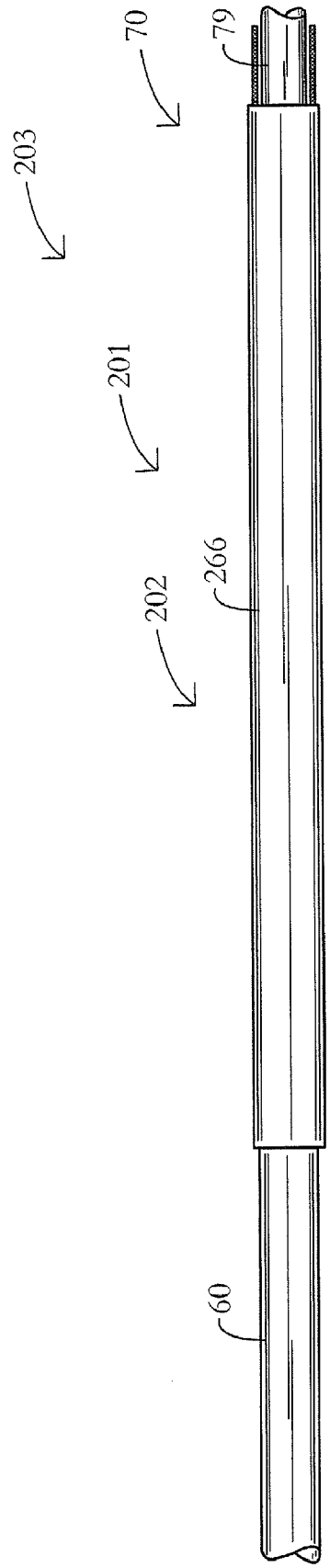

With reference to FIG. 32, a cover system 201 according to further embodiments of the present invention is shown therein. The cover system 201 can be used to form a cover assembly 202 as shown in FIG. 32. The cover assembly 202 can be a cold-applied transition joint about a connection between an oil-containing cable 70 having a metal sheath and an oil-impregnated paper insulation and a polymeric cable 60 to form a covered cable assembly 203. In some embodiments, the cover system 201 is provided as a pre-packaged kit of components for subsequent assembly by an installer (e.g., a field installer) using a method as described herein.

The cable 70 (FIG. 22) as illustrated is a single-phase cable including a conductor 72, an oil-impregnated paper insulation 74, a metal sheath 78, and a jacket 79 corresponding to components 32, 34, 38 and 39, respectively, of the cable 30. The cable 70 differs from the cable 30 in that the cable 70 includes only a single cable core 40 extending through the metal sheath 78.

The cover system 201 includes: an OBT 210 (which may be initially mounted on a holdout 111) corresponding to the OBT 110; a dual layer mastic tape 216 corresponding to the tape 116; a metal mesh tape 214; a joint pressure retention tape 254 corresponding to the tape 154; a vinyl tape 218; a CSJ body 246; a dual layer mastic tape 240 corresponding to the tape 140; a connector pressure retention tape 242 corresponding to the tape 142; and a re-jacketing sleeve 266.

Figure 22:
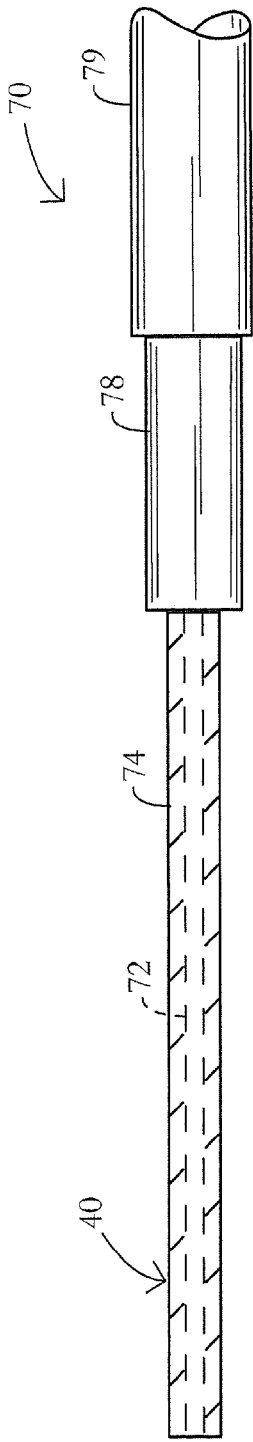
FIGS. 22-32 illustrate methods according to further embodiments of the present invention for forming a covered cable assembly according to embodiments of the present invention using a cover system according to embodiments of the present invention.

Methods according to embodiments of the present invention for installing the cover system 201 to construct the cover assembly 202 and the covered cable assembly 203 will now be described. The cables 60, 70 are prepared as described above. The prepared PILC cable 60 is illustrated in FIG. 22.

Figure 23:
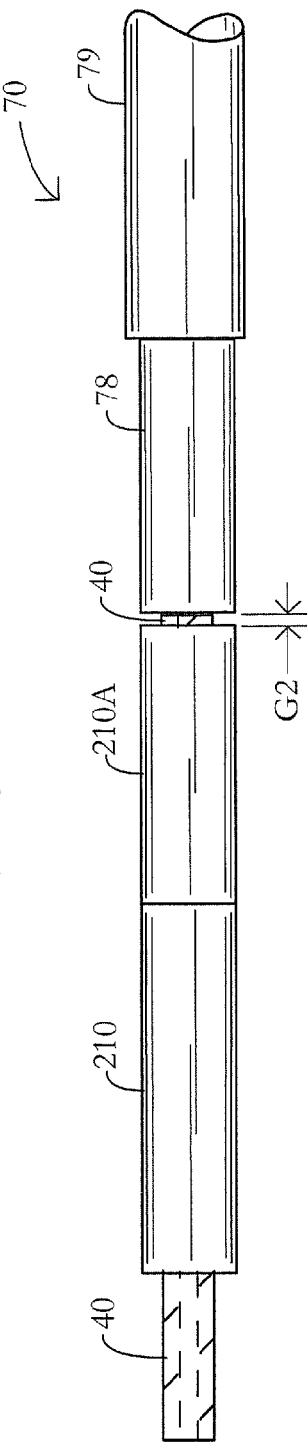

With reference to FIG. 23, the OBT 210 is installed on the cable core 40 (e.g., from a holdout) such that a gap G2 is defined between the adjacent ends of the OBT 210 and the metal sheath 78. According to some embodiments, the gap G2 has a length in the range of from about 0.04 inch (1 mm) to 0.5 inch (13 mm). A portion of the cable core 40 is exposed in the gap G2.

Figure 24:
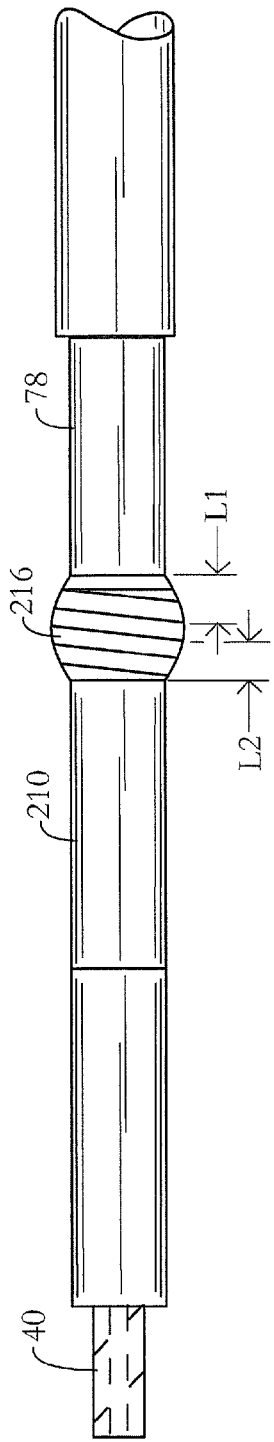

With reference to FIG. 24, the dual layer mastic tape 216 is wrapped about the OBT 210 and the cable core 40 such that the tape 216 overlaps and engages each of the OBT 210 and the metal sheath 78. In embodiments, the tape 216 overlaps the metal sheath 78 by a distance L1 in the range of from about 0.3 inch (8 mm) to 0.7 inch (18 mm). According to some embodiments, the tape 216 overlaps the OBT 210 by a distance L2 in the range of from about 0.3 inch (8 mm) to 0.7 inch (18 mm). In some embodiments, the tape 216 is elastically elongated so that, once applied to the cable 70, the tape 216 continues to persistently apply a compression load to the underlying components (i.e., a hoop stress is retained in the tape 216).

Figure 25:
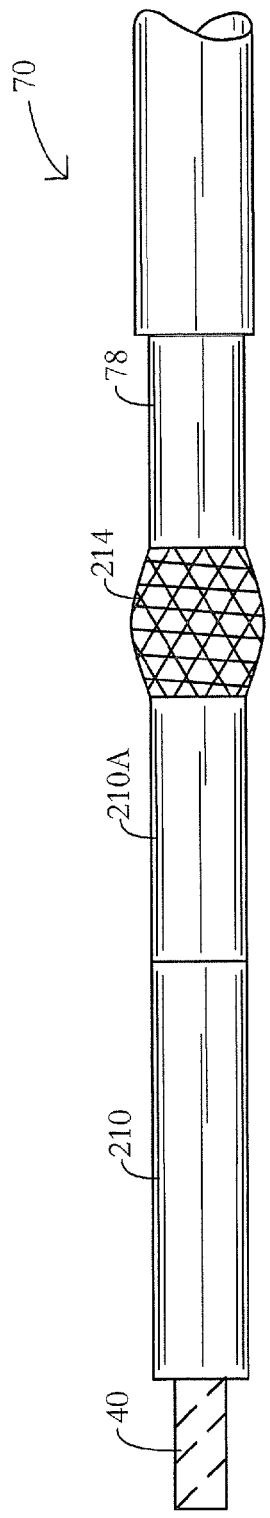

Referring to FIG. 25, the metal mesh tape 214 is wrapped over the dual layer mastic tape 216. The metal mesh tape 214 extends beyond the tape 216 on either end to overlap and engage each of the metal sheath 78 and a semiconductive portion 210A of the OBT 210.

Figure 26:
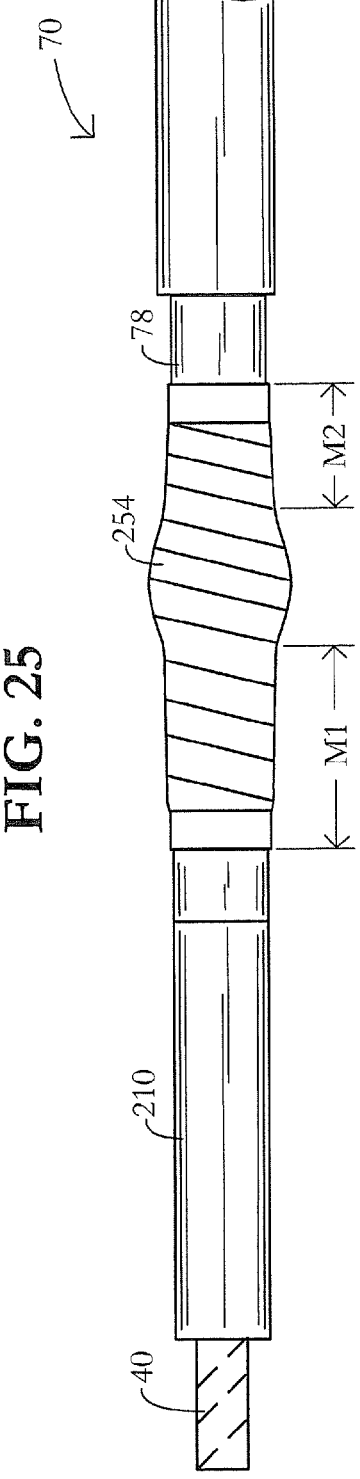

The joint pressure retention tape 254 is wrapped about the metal mesh tape 214 as shown in FIG. 26. The joint pressure retention tape 254 extends beyond the tapes 214, 216 on either end and overlaps, engages and adheres to each of the OBT 210 and the metal sheath 78. The tape 254 is elastically elongated such that, once applied to the cable 70, the tape 254 continues to persistently apply a radially compressive load to the underlying components (i.e., a hoop stress is retained in the tape 254). In some embodiments, two complete wraps of the tape 254 are applied.

Figure 27:
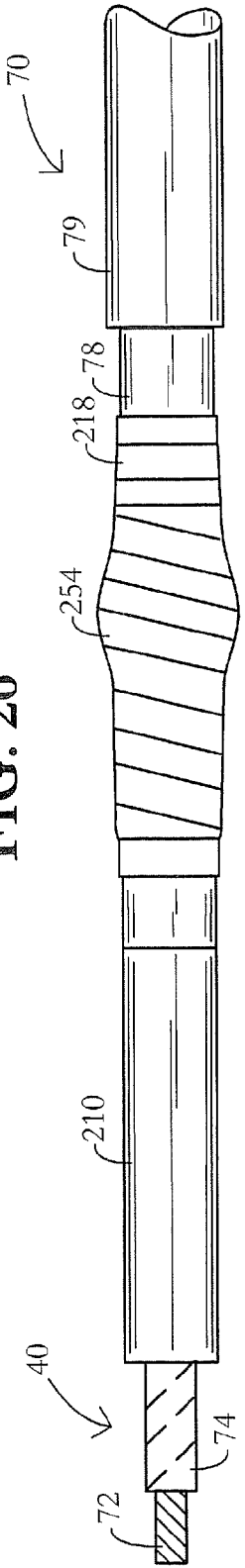

As shown in FIG. 27, the vinyl tape 218 can be wrapped over the inner end of the joint pressure retention tape 254 to reduce subsequent interference with the CSJ body 246.

Figure 28:
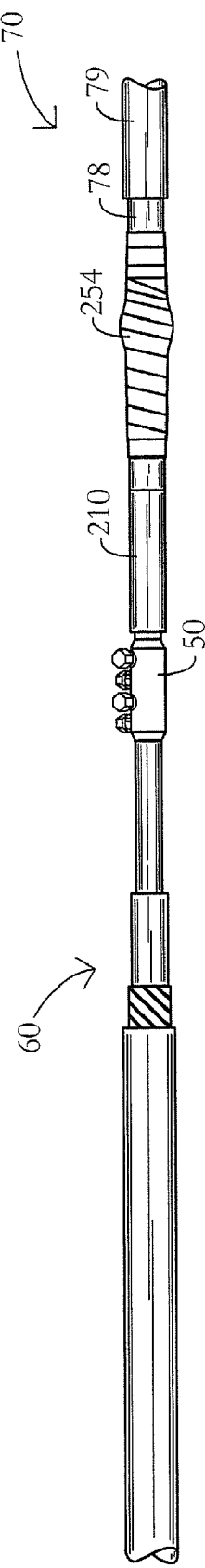
Figure 29:
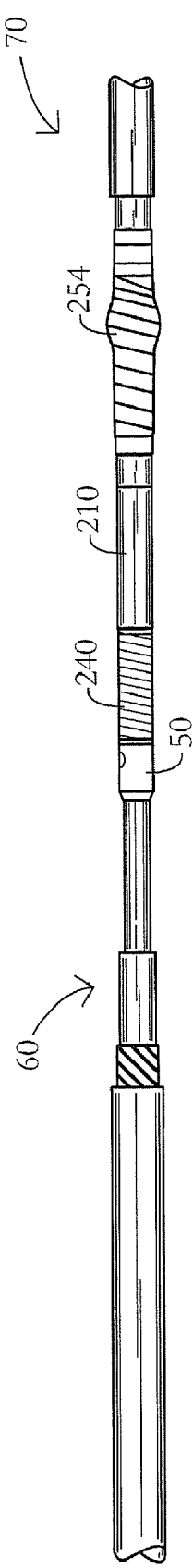
Figure 30A:
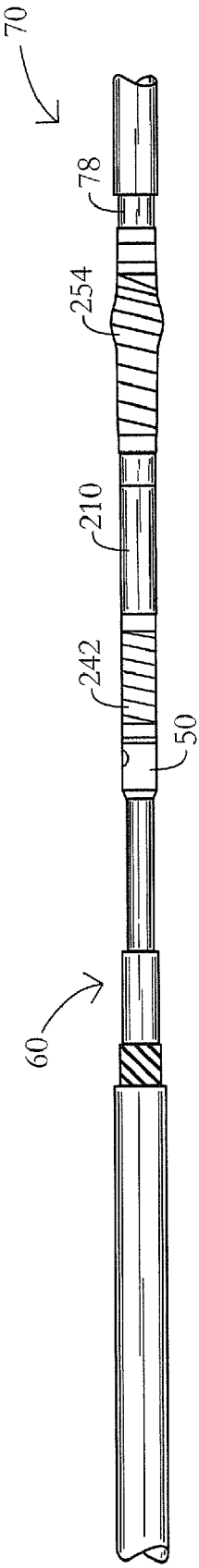
Figure 30B:
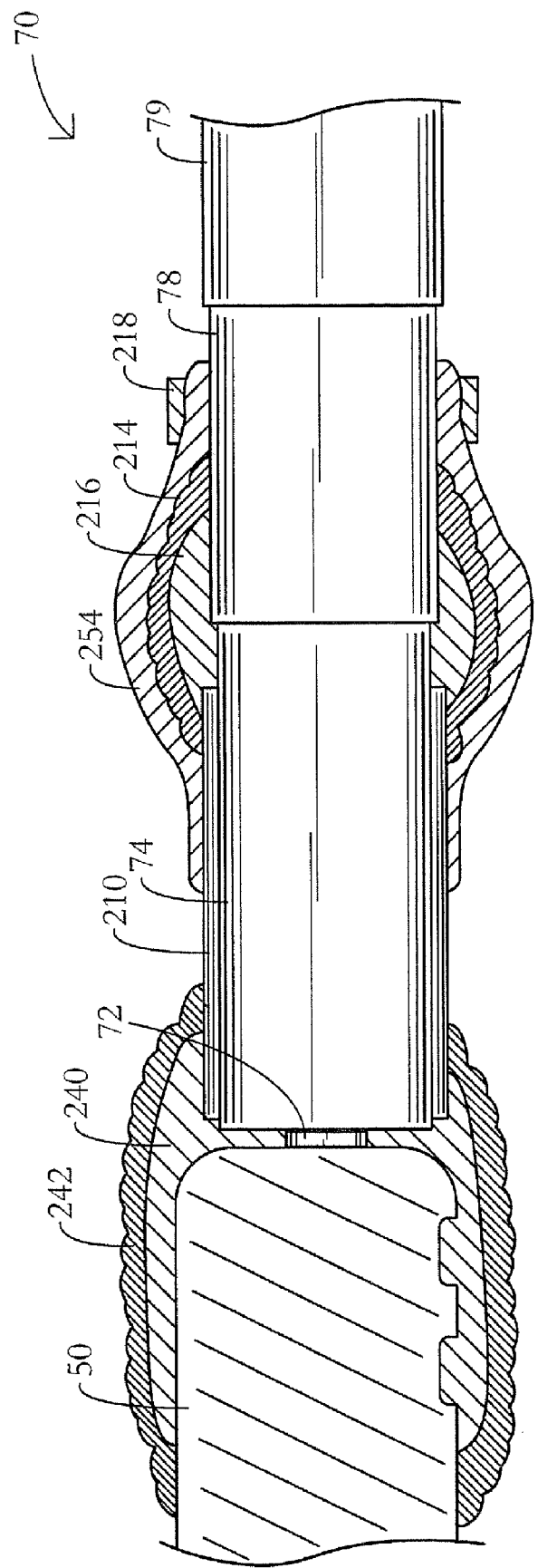

As shown in FIG. 28, the conductors 62, 72 of the cables 60, 70 are joined by a connector 50 as discussed above with reference to FIG. 13. Referring to FIGS. 29, 30A and 30B, the dual layer mastic tape 240 and the connector pressure retention tape 242 are thereafter applied to the connector 50 and the cable 70 as described above with regard to FIGS. 14 and 15 and tapes 140, 142. FIG. 30B is an enlarged, fragmentary, cross-sectional view of the construction of FIGS. 29 and 30A.

Figure 31:
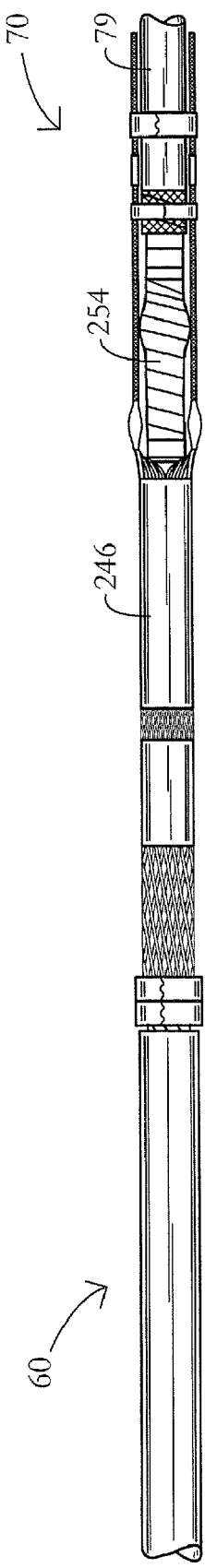

The CSJ body 246 (FIG. 31) can then be installed over the connector 50 and the metal sheath joint as shown in FIG. 31. The metal sheath 78 and the polymeric cable 60 can be suitably coupled for grounding and shielding.

The re-jacketing sleeve 266 can then be installed over the CSJ body 246 as shown in FIG. 32. Suitable re-jacketing sleeves may include the CSJA available from Tyco Electronics Corporation.

Cover assemblies according to embodiments of the invention may be used for any suitable cables and connections. Such cable assemblies may be adapted for use, for example, with connections of low voltage cables up to about 1000V and medium voltage cables up to about 65 kV.

While the connections to PILCs have been described herein with reference to PILC-to-polymeric cable transition splices, cover assemblies as disclosed herein may also be used in PILC-to-PILC splices.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A covered cable assembly comprising:
   a) a cable including:
      a metal sheath having a sheath terminal edge defining a sheath opening; and
      a first cable core extending through the metal sheath, the first cable core including an electrical conductor and an oil-impregnated paper insulation layer surrounding the electrical conductor;
      wherein an extended cable core section of the first cable core extends through the sheath opening and beyond the sheath terminal edge;
   b) an electrically conductive connector mounted on the electrical conductor;
   c) a second cable core connected to the first cable core by the connector; and
   d) a sealing assembly including:
      an oil barrier tube surrounding the extended cable core section;
      a sealing mastic surrounding the cable about the sheath terminal edge and engaging and overlapping portions of the metal sheath and the oil barrier tube adjacent the sheath terminal edge to effect an oil barrier seal between the metal sheath and the first cable core at the sheath opening;

a pressure retention tape surrounding the sealing mastic to limit displacement of the sealing mastic;

a connector mastic surrounding and engaging each of the connector and the oil barrier tube adjacent an interface between the connector and the oil barrier tube to effect an oil barrier seal about the first cable core;

a connector pressure retention tape surrounding the cable and the connector mastic and including first and second opposed end portions extending axially beyond the connector mastic, wherein the first end portion overlaps and adheres to the connector and the second end portion overlaps and adheres to the oil barrier tube; and a cold shrink joint body surrounding the connector, the connector mastic, and the connector pressure retention tape, and overlapping each of the second cable core and the oil barrier tube;

wherein the connector pressure retention tape is a self-amalgamating tape including a mass of a tape sealant on a fabric substrate, and the fabric substrate limits elongation of the connector pressure retention tape.

2. The covered cable assembly of claim 1 wherein the pressure retention tape applies and maintains a compressive load on the sealing mastic.

3. The covered cable assembly of claim 1 wherein the pressure retention tape overlaps and adheres to the metal sheath and overlaps and adheres to the oil barrier tube.

4. The covered cable assembly of claim 1 wherein the pressure retention tape is in direct contact with the sealing mastic.

5. The covered cable assembly of claim 4 wherein the pressure retention tape is a self-amalgamating tape including a mass of a tape sealant on a fabric substrate, and the fabric substrate limits elongation of the retention tape.

6. The covered cable assembly of claim 1 wherein:
a) the cable further includes a third cable core extending through the metal sheath, the first and second cable cores having first and second extended cable core sections, respectively, extending through the sheath opening and beyond the sheath terminal edge;
b) the sealing assembly further includes:
a second elastomeric oil barrier tube surrounding the second extended cable core section;
a third elastomeric oil barrier tube surrounding the third extended cable core section;
c) the sealing mastic surrounds the cable about the sheath terminal edge and engages and overlaps portions of the metal sheath and each of the first, second and third oil barrier tubes adjacent the sheath terminal edge to effect an oil barrier seal between the metal sheath and each of the first, second and third cable cores at the sheath opening; and
d) the pressure retention tape surrounds each of the first, second and third oil barrier tubes, collectively.

7. The covered cable assembly of claim 6 wherein the sealing mastic includes:
a first mastic portion wrapped fully around the first oil barrier tube;
a second mastic portion wrapped fully around the second oil barrier tube;
a third mastic portion wrapped fully around the third oil barrier tube; and
a sheath mastic portion wrapped fully around the metal sheath at the sheath terminal edge.

8. The covered cable assembly of claim 6 wherein:
the sealing assembly further includes an elastomeric breakout having a main tubular body and first, second and third tubular fingers integral with the main tubular body;
the metal sheath is disposed in the main tubular body;
the first, second and third extended cable core sections and the first, second and third oil barrier tubes extend through the first, second and third tubular fingers, respectively;
the sealing mastic is disposed in the breakout; and
the pressure retention tape surrounds the breakout.

9. The covered cable assembly of claim 8 wherein the breakout directly engages the sealing mastic.

10. The covered cable assembly of claim 8 wherein:
the sealing assembly further includes an insert member, the insert member having a plurality of legs interposed between the first, second and third tubular fingers; and
the pressure retention tape surrounds the insert member.

11. The covered cable assembly of claim 10 wherein the pressure retention tape compressively loads the insert member such that the insert member conforms to and loads the first, second and third tubular fingers.

12. The covered cable assembly of claim 6 wherein the pressure retention tape is a self-amalgamating silicone tape.

13. A method for forming a covered cable assembly, the method comprising:
providing a cable including:
a metal sheath having a sheath terminal edge defining a sheath opening; and
a first cable core extending through the metal sheath, the first cable core including an electrical conductor and an oil-impregnated paper insulation layer surrounding the electrical conductor;
wherein an extended cable core section of the first cable core extends through the sheath opening and beyond the sheath terminal edge;
mounting an oil barrier tube on the extended cable core section such that the oil barrier tube surrounds the extended cable core section;
applying a sealing mastic to the cable such that the sealing mastic surrounds the cable about the sheath terminal edge and engages and overlaps portions of the metal sheath and the oil barrier tube adjacent the sheath terminal edge to effect an oil barrier seal between the metal sheath and the first cable core at the sheath opening; and
applying a pressure retention tape to surround the sealing mastic to limit displacement of the sealing mastic;
wherein:
the cable further includes second and third cable cores extending through the metal sheath, the first and second cable cores having first and second extended cable core sections, respectively, extending through the sheath opening and beyond the sheath terminal edge; and
the method further includes:
mounting a second elastomeric oil barrier tube on the second extended cable core section such that the second oil barrier tube surrounds the second extended cable core section;
mounting a third elastomeric oil barrier tube on the third extended cable core section such that the third oil barrier tube surrounds the third extended cable core section;
applying the sealing mastic includes applying the sealing mastic to the cable such that the sealing mastic surrounds the cable about the sheath terminal edge and overlaps portions of the metal sheath and each of the first, second and third oil barrier tubes adjacent the sheath terminal edge to effect an oil barrier seal between the metal sheath and each of the first, second and third cable cores at the sheath opening; and applying the pressure retention tape includes mounting the pressure retention tape to surround each of the first, second and third oil barrier tubes;

mounting an elastomeric breakout having a main tubular body and first, second and third tubular fingers integral with the main tubular body on the cable such that:

the metal sheath is disposed in the main tubular body;

the first, second and third extended cable core sections and the first, second and third oil barrier tubes extend through the first, second and third tubular fingers, respectively; and the sealing mastic is disposed in the breakout;

wherein applying the pressure retention tape includes mounting the pressure retention tape to surround the breakout.

14. The method of claim 13 wherein applying the pressure retention tape includes mounting the pressure retention tape in direct contact with the sealing mastic.

15. A cover system for covering a cable including a metal outer sheath and multiple cable cores, each cable core including an electrical conductor surrounded by an oil-impregnated paper insulation, the cover system including:
a) a plurality of oil barrier tubes each configured to be mounted on a respective one of the cable cores;
b) a sealing mastic to be mounted on the oil barrier tubes and the metal sheath to effect an oil barrier seal between the metal sheath and the cable cores at an opening of the metal sheath;
c) an elastomeric breakout having a main tubular body to receive the metal sheath and a plurality of tubular fingers integral with the main tubular body and configured to receive respective ones of the cable cores;
d) an insert member, the insert member having a plurality of legs configured to be interposed between the first, second and third tubular fingers; and
e) a pressure retention tape to surround the sealing mastic, the breakout and the insert member to limit displacement of the sealing mastic.

16. A covered cable assembly comprising:
a) a cable including:
a metal sheath having a sheath terminal edge defining a sheath opening; and
a cable core extending through the metal sheath, the cable core including an electrical conductor and an oil-impregnated paper insulation layer surrounding the electrical conductor;
wherein an extended cable core section of the cable core extends through the sheath opening and beyond the sheath terminal edge;
b) an electrically conductive connector mounted on the electrical conductor; and
c) a sealing assembly including:
an oil barrier tube surrounding the extended cable core section;
a connector mastic surrounding and engaging each of the connector and the oil barrier tube adjacent an interface between the connector and the oil barrier tube to effect an oil barrier seal about the cable core;
a connector pressure retention tape surrounding the cable and the connector mastic and including first and second opposed end portions extending axially beyond the connector mastic, wherein the first end portion overlaps and adheres to the connector and the second end portion overlaps and adheres to the oil barrier tube;
a vinyl tape wrapped around the connector pressure retention tape; and
cold-shrink joint body encapsulating the connector pressure retention tape, the mastic tape, and the vinyl tape.

17. The covered cable assembly of claim 2 wherein a hoop stress is retained in the pressure retention tape and the pressure retention tape applies and maintains a persistent radially compressive load on the underlying sealing mastic.

18. The covered cable assembly of claim 17 wherein the persistent radially compressive load is in the range of from about 6 to 16 psi.

19. The method of claim 13 wherein applying the pressure retention tape includes mounting the pressure retention tape around the sealing mastic such that a hoop stress is retained in the pressure retention tape and the pressure retention tape applies and maintains a persistent radially compressive load on the underlying sealing mastic.

20. The cover system of claim 15 wherein a hoop stress is retained in the pressure retention tape and the pressure retention tape applies and maintains a persistent radially compressive load on the underlying sealing mastic, breakout and insert member.

21. The covered cable assembly of claim 16 wherein a hoop stress is retained in the connector pressure retention tape and the connector pressure retention tape applies and maintains a persistent radially compressive load on the underlying connector mastic.

22. The cover system of claim 15 wherein the pressure retention tape is a self-amalgamating tape.

23. The cover system of claim 22 wherein the pressure retention tape is a fusible silicone tape.

24. The cover system of claim 15 wherein the legs are generally planar and circumferentially spaced apart.

25. The cover system of claim 15 wherein the insert member is formed of a resiliently deformable material.

26. The cover system of claim 15 wherein the insert member is formed of an elastomeric material.

* * * * *

UNITED STATES PATENT AND TRADEMARK OFFICE
Certificate

Patent No. 8,324,502 B2                                                                      Patented: December 4, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Floyd Kameda, Mountain View, CA (US); Kathryn Marie Maher, Cary, NC (US); David Francis Pearce, Swindon (GB); and Timothy J. McLaughlin, Fuquay-Varina, NC (US).

Signed and Sealed this Eleventh Day of November 2014.

<div align="right">

TIMOTHY THOMPSON
*Supervisory Patent Examiner*
Art Unit 2847
Technology Center 2800

</div>